(No Model.)
E. WESTON.
CONDUCTOR FOR ELECTRIC CIRCUITS.
No. 292,717. Patented Jan. 29, 1884.
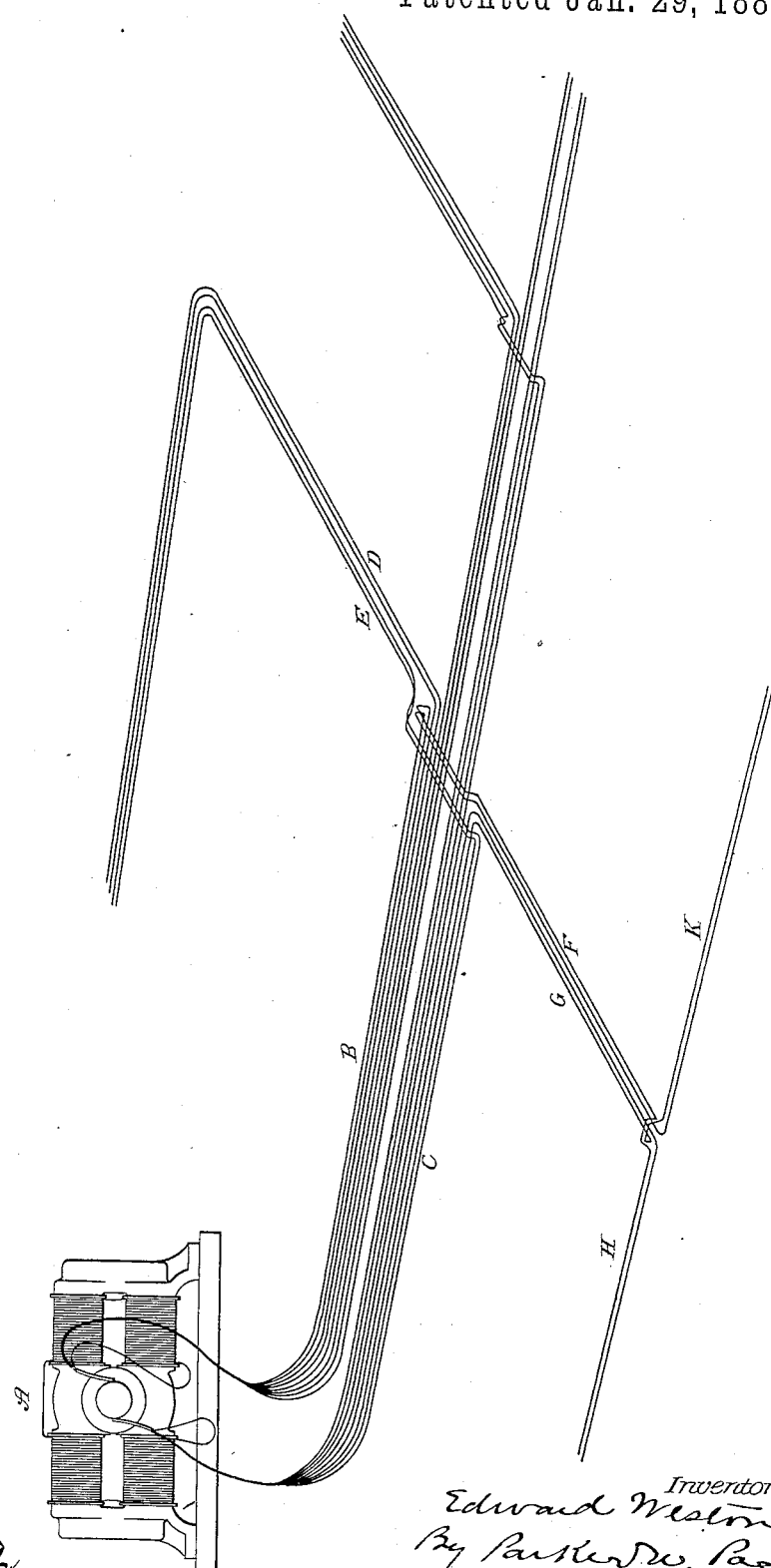

UNITED STATES PATENT OFFICE.

EDWARD WESTON, OF NEWARK, NEW JERSEY, ASSIGNOR TO THE UNITED STATES ELECTRIC LIGHTING COMPANY, OF NEW YORK, N. Y.

CONDUCTOR FOR ELECTRIC CIRCUITS.

SPECIFICATION forming part of Letters Patent No. 292,717, dated January 29, 1884.

Application filed October 10, 1883. (No model.)

*To all whom it may concern:*

Be it known that I, EDWARD WESTON, a subject of the Queen of Great Britain, and a resident of Newark, in the county of Essex and State of New Jersey, have invented certain new and useful Improvements in Conductors for Electric Circuits, of which the following is a specification.

My invention is an improvement in systems of incandescent lighting or the like, where the devices for utilizing electrical energy are connected with the generator in multiple arc. Its object is to facilitate and and to reduce the cost of running the circuits which such systems require. Heretofore in these systems the main circuit has been formed by conductors composed of single wires, bars, or rods, or of an assemblage of small wires or strands. The branch circuits have been formed by connecting with the main conductors other and independent conductors, the sub-branches being formed from the branches in a similar way. In some cases a number of insulated conductors, each forming part of an independent circuit, have been run from the poles of the generator in groups and led off to the buildings or other places where the lights are located. The first of these systems necessitates the employment of expensive appliances—such as junction and connection boxes—and the use of more metal in the conductors than is required, while the second secures only in part the objects obtained by my arrangements, in that each pair of conductors constitutes in reality a main circuit from which the sub-circuits or branches must be formed in the ordinary way. These objects I avoid by employing main conductors composed of a suitable number of comparatively fine wires, and forming the branches by running off from the mains the required number of wires or strands to carry the current necessary to supply the electrical devices connected with the branches. In this way I avoid not only the difficulties of running or laying the circuit in which single conductors of large size are used, but also the expense and trouble which the common plan of connections involves.

The invention is illustrated in the accompanying drawing, which represents the circuits of a system for multiple-arc distribution.

A is a generator. The main line is formed by the conductors B C, each composed of an assemblage of small wires uninsulated and in contact with one another and connected to the terminals of the generator. These conductors I prefer to support in channels or grooves in insulating-slats, as explained by me in other applications. The number and size of the conductors composing the mains B C will be such as to convey, properly, the total current used in the system.

At a given point in the circuit it may be desirable to run off one or more branches, in which a given amount of current is to be utilized—as, for example, in running a certain number of incandescent lamps. At such point, in lieu of connecting independent conductors to the main line, I bend and carry off to form the branch as many wires from each main conductor as may be required. The letters D E designate a branch so formed, F G being a similar branch, taken off at the same point, the branch wires from one of the conductors being carried under or over the other, and insulated in any proper manner from it. These branches may be further branched or divided, as indicated at H K. In this way the amount of conducting material in the circuit and branches will be reduced in proportion to the amount of current that has to be conveyed thereby. The conductors are more easily laid, and the branches and divisions of the circuit more readily formed.

In practice any suitable holders for the wires, junction and connection boxes, and like devices may be employed, and for the conductors I may use wires or strips. Without confining myself, therefore, to any special devices for use with the circuit,

What I claim is—

An electric circuit for multiple-arc distribution, consisting of mains composed of a number of assembled conductors or wires in electrical contact with one another, and which in the aggregate are capable of conveying the total current generated, and branches or divisions composed of portions of said wires bent and led off from the mains, the number of wires in the said branches or divisions being proportionate to the current to be used therein, as set forth.

In testimony whereof I have hereunto set my hand this 5th day of October, 1883.

EDWARD WESTON.

Witnesses:
 W. FRISBY,
 W. H. DOGGETT.